Jan. 14, 1958  C. WEILL ET AL  2,820,141
CONTROL CIRCUIT FOR PULSE GENERATOR
Filed June 14, 1954  2 Sheets-Sheet 1
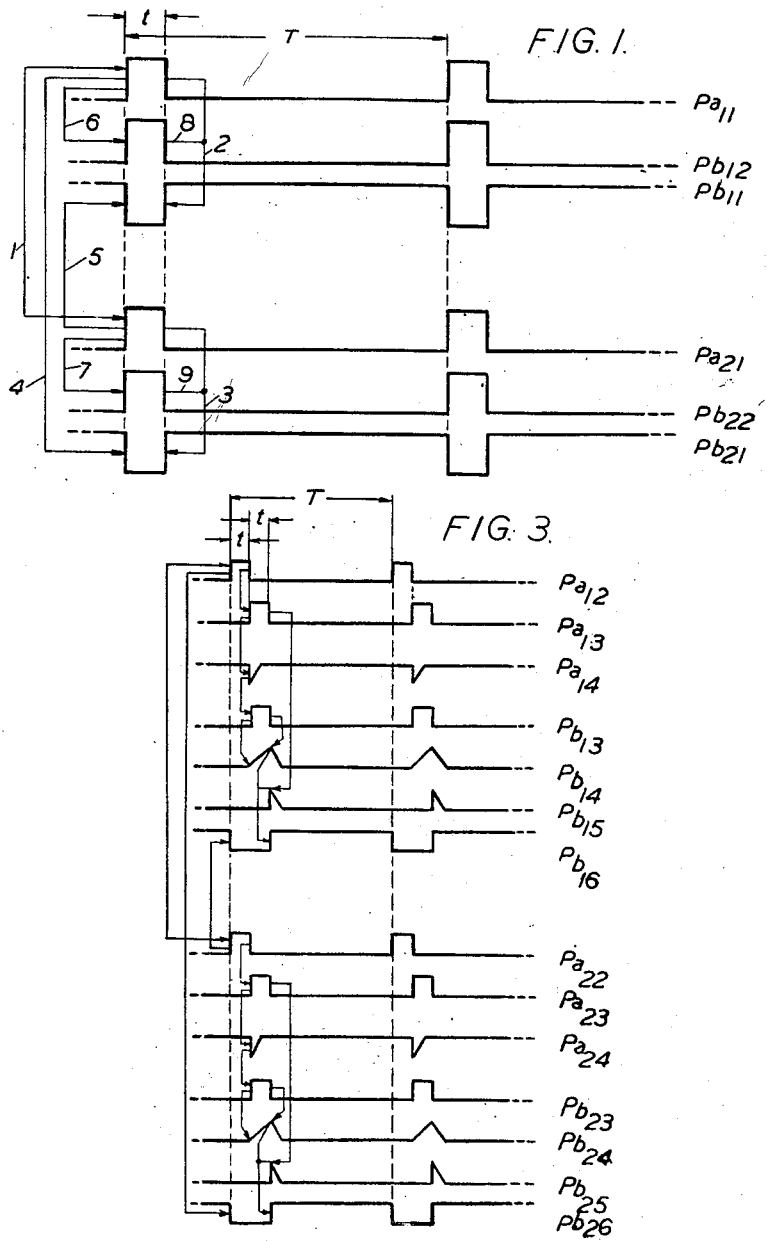
Inventors
C. WEILL-
C. HANNIGSBERG-
H. H. ADELAAR
By Philip M Bolton
Attorney

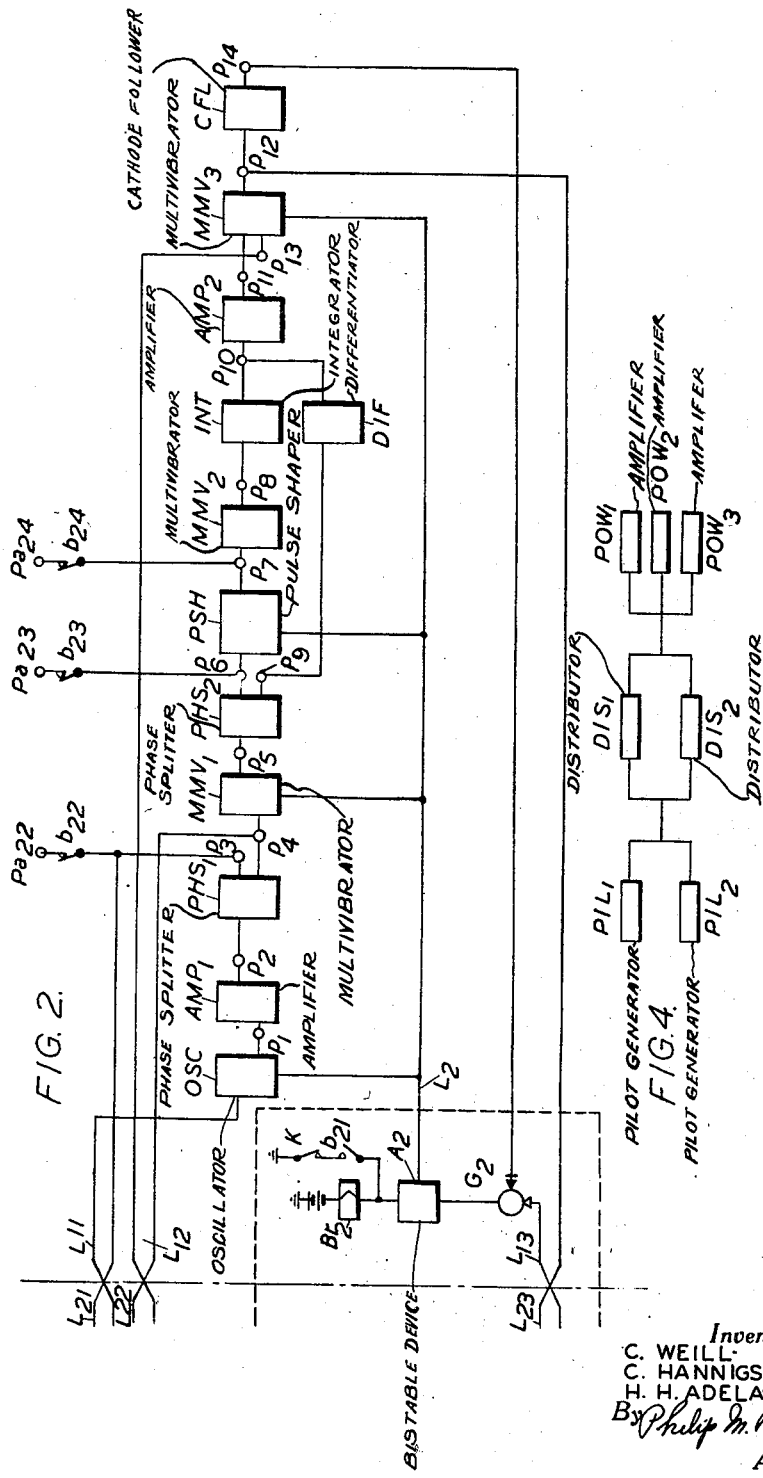

United States Patent Office 2,820,141
Patented Jan. 14, 1958

2,820,141

CONTROL CIRCUIT FOR PULSE GENERATOR

Camille Weill and Claude Hannigsberg, Paris, France, and Hans Adelaar, Antwerp, Belgium, assignors to International Standard Electric Corporation, New York, N. Y., a corporation of Delaware Application June 14, 1954, Serial No. 436,620

Claims priority, application Netherlands June 17, 1953

6 Claims. (Cl. 250—27)

The invention relates to a control circuit for a pulse generator.

In the Belgian Patent No. 504,604, pulse generator equipment has been described wherein all circuits used for generating pulses are duplicated. This is essential if no interruption in the distribution of the generated pulses is to be tolerated since a failure in one circuit will not lead to an interruption of the pulse supply if both identical halves of the generators are normally supplying the load with half the necessary power. It is only when there is a fault in one half of the apparatus that this one half will be switched off from the common load, the other half supplying full power during that period in which the faulty half is being repaired or replaced by a spare circuit.

The essential part of each half of the generator equipment is a master oscillator which produces pulses of period T which in turn will be used to produce a variety of auxiliary pulses. It is imperative therefore, that a fault in the circuit of one master oscillator should be immediately detected so that the circuit can be disconnected from the common load before the fault can cause any undesired influence on the shape of the pulses which continue to be supplied by the other master oscillator circuit. A way to detect a fault is to continuously compare the pulses issued by both master oscillators with one another and to cause a control circuit to react upon, there being a dissimilarity between the pulses compared.

A control circuit of this type, which is essentially a potential comparator, has been disclosed in the Belgian Patent No. 504,605 and is a device with three stable electrical conditions. One stable condition corresponds to a normal state of affairs in which identical pulses are issued by both oscillators. The second stable condtion corresponds to a pulse being issued by the first oscillator and none being simultaneously issued by the second oscillator, while the third stable condition corresponds to the opposite situation. Incidentally, such a comparator which stays in its normal condition when the outputs of the two oscillators are similar, will remain in that condition if both oscillators should fail exactly at the same time since then, the conditions at their outputs will still correspond. However, such a likelihood is so remote that the arrangement can be considered as quite satisfactory. If both oscillators should fail simultaneously, all the chances are that this is due to the failure of a common supply which can be detected by other control means, and not due to simultaneous individual and independent failures in each oscillator circuit.

Such a comparator has, however, one drawback which is the following:

If, due to some fault in one oscillator circuit, the pulses delivered from that oscillator become longer than the pulses delivered by the second oscillator, the comparator can be made to move to one of its off normal conditions, indicating that the first oscillator is faulty and causing an alarm to be raised as well as the disconnection of the faulty oscillator from the common load. However, if a fault occurs in the second oscillator circuit and such that the length of the pulses issued by that oscillator is reduced, then the comparator will react in exactly the same way as before, as it cannot distinguish between the fact that one pulse is longer than the other and the fact that the other pulse is shorter than the former. This would result in the first generator being put out of action although it is the second which has developed the fault.

An object of the invention is to use a pulse comparator with two inlets and with two off normal conditions, one corresponding to a pulse at the first inlet with none at the second and the second off normal condition corresponding to a pulse at the second inlet and none at the first as valve control means for two identical pulse generators in such a way that variations in the length of the pulses delivered by one oscillator in one sense or the other, including the disappearance of said pulses, always result in the comparator being thrown into one particular off normal condition corresponding exclusively with a fault in that oscillator which delivers pulses of abnormal length.

Another object of the invention resides in the provision of means whereby bidirectional variations in the length of a pulse result in unidirectional variations in the length of auxiliary pulses used for control purposes.

In relation to a control circuit for pulse generator, the latter comprising two identical pulse oscillators with mutual synchronization between corresponding pulse edges and the former a pulse comparator able to be thrown into a first or a second off normal stable condition upon a pulse at one of its two inlets appearing without one at the other or vice versa, a characteristic feature of the invention resides in that corresponding pulse edges derived from the first and the second oscillators are respectively used to trigger a first and a second two condition device, one of which condition is stable, from the stable to the unstable condition, the outputs from said devices being respectively coupled to the inlets of said comparator, the natural period of said devices being smaller than T the period of the pulses from said oscillators.

In relation to a similar arrangement, another characteristic feature of the invention resides in that corresponding pulse edges derived from the first and the second oscillators are used to trigger a first and a second two-output condition device from a first condition to a second respectively, while the other corresponding pulse edges are used to respectively trigger said second and first devices from said second to said first condition, the outputs from said devices being respectively coupled to the inlets of said comparator.

The above mentioned and other objects and features of the invention will become more apparent and the invention itself will be best understool by referring to the following description of an embodiment taken in conjunction with the accompanying drawings which represent:

Fig. 1, pulse wave forms useful to explain the principle of the invention;

Fig. 2, a preferred embodiment of the invention shown in block schematic form;

Fig. 3, pulse wave forms useful to explain the working of the arrangements shown in Fig. 2;

Fig. 4, a block schematic to explain how the arrangement of Fig. 2 can be integrated in a pulse distributor scheme.

Referring to Fig. 1, which is a preliminary figure necessary for the understanding of the invention described in conjunction with Figs. 2 and 3, the pulse wave forms delivered by two identical pulse oscillators (not shown) are represented as $Pa_{11}$ and $Pa_{21}$ respectively. The pulses are shown as positive pulses of duration $t$ recurring with a period T. Normally, the two pulse waves are coincident at all times. The two oscillators are mutually synchronized and this is indicated by the link 1 between the leading edges of the $Pa_{11}$ and $Pa_{21}$ pulses. Links 2 and 3 respectively between the trailing edge of the $Pa_{11}$ pulse and the leading edge of the positive $Pb_{11}$ pulse and between the trailing edge of the $Pa_{21}$ pulse and the leading edge of the positive $Pb_{21}$ pulse, are used to indicate that the end of the $Pa_{11}$ pulse results in the appearance of a control pulse $Pb_{11}$ which is also positive and that correspondingly, the end of a $Pa_{21}$ pulse results in the appearance of a positive control pulse $Pb_{21}$. Links 4 and 5 are used to indicate that the leading edge of a $Pa_{11}$ pulse results in the termination of the $Pb_{21}$ pulse while the leading edge of a $Pa_{21}$ pulse results in the termination of the $Pb_{11}$ pulse.

In this manner, auxiliary control pulses $Pb_{11}$ and $Pb_{21}$ are produced which can be used as inputs for a three-stable condition pulse comparator of the type disclosed in the above mentioned Belgian Patent No. 504,605. If the $Pa_{11}$ pulse for example, increases in length, this will be accompanied by a reduction of the length of the control $Pb_{11}$ pulse and there will be a time during which a $Pb_{21}$ pulse will not coincide with a $Pb_{11}$ pulse whereby the pulse comparator will react to indicate that the $Pa_{11}$ pulse has an incorrect length. On the other hand, if the $Pa_{11}$ pulse disappears altogether, the corresponding $Pb_{11}$ pulse will also disappear and this will result in the said pulse comparator reacting in the same way to indicate the disappearance of the $Pa_{11}$ pulse.

The device producing the control pulses $Pb^{11}$ and $Pb_{21}$ may be bistable devices or they may be monostable devices with a natural period greater than T. In this last case, if a pulse such as $Pa_{11}$ for example disappears, the corresponding control pulse $Pb_{11}$ will disappear but the absence of the $Pa_{11}$ pulse will also result in the $Pb_{21}$ control pulse being continued for a duration greater than $T-t$ permitting the pulse comparator to react in the right way.

Also, the devices producing the control pulses $Pb_{11}$ and $Pb_{21}$ might be monostable devices of natural period less than T if the control shown by the links 4 and 5 is not used.

It will be remarked that the above assumes that if a pulse such as $Pa_{11}$ disappears, it dies away rapidly and completely, i. e. one $Pa_{11}$ pulse is normal and there is no next one. This is not always the case in practice and sometimes it will be found that when a $Pa_{11}$ pulse generated by a master oscillator disappears, it does so with a gradual reduction of the pulse length normally equal to $t$. In such a case, the corresponding control pulse $Pb_{11}$ would have its origin displaced towards the left whereas the $Pb_{21}$ control pulse would remain normal. This would cause the comparator to react but to indicate that it is the $Pa_{21}$ pulse which has an incorrect length. To prevent this, the comparator can be fitted with a delay device which makes it unable to react to a dissimilarity between pulses at its two inlets during a time $t$ equal to the pulse duration of $Pa_{11}$ and $Pa_{21}$. In the case of the comparator disclosed in the Belgian Patent No. 504,605, this delay can be conveniently obtained by connecting a condenser across one of the two resistors which are used as a potentiometer to provide a bias for the control grid of a gas tube with respect to its cathode. Then, when a pulse is received at the control grid, it is not immediately able to change the potential of the latter whereby, if there is no corresponding pulse of same polarity at the cathode of same tube, the latter will still be unable to be immediately ionized. This means that in the case of a reduction of the pulse length for the $Pa_{11}$ pulses, by the time that the grid potential has been modified by the $Pb_{11}$ pulse which is in advance with respect to the $Pb_{21}$ pulse, the latter will have arrived at the cathode preventing the ionization of the tube. But, as soon as the $Pa_{11}$ pulse has completely disappeared, then the corresponding control $Pb_{11}$ pulse will no longer be issued and the comparator will react in the right manner.

Such an arrangement is satisfactory provided that once a pulse such as $Pa_{11}$ starts to reduce its pulse length, this soon leads to the complete disappearance of the pulse. If the pulse length is reduced to half way for example, and remains at that length, the comparator would not react in the incorrect way due to the delay $t$ but on the other hand it would also not react to indicate the abnormal decrease in length of the $Pa_{11}$ pulse. The additional control pulses $Pb_{12}$ and $Pb_{22}$ permit to take care of this eventuality.

The $Pb_{12}$ and $Pb_{22}$ pulses are generated by monostable devices which produce a pulse starting at the same time as the respective $Pa_{11}$ and $Pa_{21}$ pulses. This is indicated by the links 6 and 7. The natural period of these monostable devices is designed to be equal to the normal duration $t$ of the $Pa_{11}$ and $Pa_{21}$ pulses and the trailing edges of the positive $Pb_{12}$ and $Pb_{22}$ auxiliary control pulses are then respectively used to permit the trailing edge of the $Pa_{11}$ pulse to start the $Pb_{11}$ control pulse and the trailing edge of the $Pa_{21}$ pulse to start the $Pb_{21}$ control pulse. These controls, which are in effect gating controls, are indicated by the links 8 and 9 respectively joining the links 2 and 3. With such an additional control, if a $Pa_{11}$ pulse for example is reduced in length, its trailing edge will try to produce the control pulse $Pb_{11}$ but will be prevented from doing so as there is no coincident trailing edge of the auxiliary control $Pb_{12}$ pulse to permit the generation of the $Pb_{11}$ pulse. Hence, the latter pulse will disappear and the comparator will react in the right way indicating that the $Pa_{11}$ pulse is faulty. Additionally, the auxiliary control pulse such as $Pb_{12}$ will also prevent the generation of the control $Pb_{11}$ pulse even if the pulse length for $Pa_{11}$ is increased above its normal value as in this case also, the trailing edge of the $Pa_{11}$ pulse will come after the trailing edge of the auxiliary control $Pb_{12}$ pulse, will not be gated by the latter and generation of the control $Pb_{11}$ pulse will be stopped. This has the advantage in the case of a pulse comparator reacting after a delay $t$ as explained above, that the pulse comparator will react immediately when the $Pa_{11}$ pulse exceeds a duration $t$ whereas without the auxiliary control pulses $Pb_{12}$ and $Pb_{22}$, it can only react upon the $Pa_{11}$ and $Pa_{12}$ pulses reaching a length $2t$.

If a fault occurs in the devices generating the control pulses $Pb_{11}$ and $Pb_{21}$, the absence of one of these pulses will result in the pulse comparator reacting in the proper manner to indicate a fault.

If a fault occurs in the monostable devices producing the auxiliary control pulses $Pb_{12}$ and $Pb_{22}$, whether there is a reduction or an increase of the normal length of these pulses, their trailing edges will be unable to exercise their gating action at the proper time and the corresponding $Pb_{11}$ or $Pb_{21}$ control pulses will not be generated resulting in a reaction of the pulse comparator indicating a fault in the proper half of the circuits concerned.

In each case, the reaction of the comparator causes a change of potential at one out of two points of its circuit, which change of potential is used in conventional manner to produce the immediate blocking of all the pulse generating circuits in that half of the arrangement which has been found defective. This blocking action which may conveniently be exerted by biassing the grid cathode circuits of appropriate valves beyond cut-off, is electronic and therefore practically instantaneous whereby within a time less than T the faulty half of the circuit is blocked.

Referring to Fig. 2, the latter illustrates an embodiment of the invention in block schematic form. It represents one half of a pulse generator which is primarily designed to supply trigger pulses of period T which are used to drive pulse distributors of the ring counter type, the latter delivering series of pulse frames each frame having a predetermined phase relationship with respect to the others. These pulse frames can be used to control switching devices of the static type (e. g. using rectifiers) such as those affording connections between a common inlet and one out of a plurality of outlets on a time multiplex basis.

Only half of the pulse generator is shown in Fig. 2 as the other half is exactly identical to the one shown and the vertical dash-dotted line on the left-hand side of the figure is used to indicate that there exist circuits similar to those shown in Fig. 2 symmetrically arranged with respect to the axial line.

The essential element for each half of a pulse generator is a pulse oscillator OSC which delivers positive pulses shown by $Pa_{12}$ in Fig. 3. To fix ideas, these pulses may be assumed to have a length of 25 microseconds and to regularly recur with a period of 200 microseconds. Such a generator should be self-starting and extremely stable in operation. One suitable for this purpose has been described in Belgian Patent 526,611 and consists of two valves with mutual anode-grid connections and an LC anti-resonant circuit connected between the anode circuits of the two valves and tuned to 5 kc./s. The circuit is so arranged that the pulses can be delivered at the cathode of one of the valves, i. e. at point $P_1$ in Fig. 2.

These pulses are applied to the input of an amplifier $AMP_1$ which need not be further described as it may be of conventional design and comprises for example, a single triode, the plate of which is coupled to point $P_2$. The pulses appearing at $P_2$ are therefore identical to those at point $P_1$, except that their polarity is reversed so that they consist in negative instead of positive pulses.

These pulses are fed to a phase splitter $PHS_1$ which is also of conventional design and it may, for example, consist of a single triode with plate and cathode loads of substantially equal values. Assuming that the plate of this last arrangement is connected to point $P_3$, positive pulses will appear at this point and will be similar to those at $P_1$.

These pulses are fed to conductor $L_{21}$ which leads to the other half of the pulse generating system (not shown). In particular, it leads to the identical master pulse generator and corresponding with OSC so that the effect of the pulses at point $P_3$ can be considered by assuming that the corresponding pulses from the other half of the arrangement, i. e. from point $P'_3$ (not shown), and present on conductor $L_{11}$, are fed to OSC. More particularly, if it is assumed that this generator OSC is of the type disclosed in the above mentioned Belgian Patent 526,611, conductor $L_{11}$ may be connected to the grid of the triode at the cathode of which positive pulses are delivered (point $P_1$). This connection will, of course, be made through a suitable coupling condenser (not shown), since the pulses at point $P_3$ or point $P'_3$ (not shown) are taken from the plate of a tube.

The positive pulses at point $P_3$ go to a terminal $Pa_{22}$ corresponding with the pulse wave form shown in Fig. 3, through break contact $b_{22}$ of relay $Br_2$.

The cathode output of the phase splitter $PHS_1$ is coupled to point $P_4$ and the pulses appearing thereat are of opposite polarity with respect to those appearing at point $P_3$. These negative pulses are applied to a generator $MMV_1$ which is a monostable multivibrator able to deliver an output pulse at terminal $P_5$ in response to an input pulse at $P_4$. Such a monostable pulse generator (flip-flop) may, for example, be obtained by using two valves, the grid of the first being fed from point $P_4$, the anode of the first being capacitively coupled to the grid of the second, the anode of the latter being resistively coupled to the grid of the former, while the plate of the former is further coupled to point $P_5$. Normally, the first valve with the grid fed from point $P_4$ is in a non-conductive state due to a more positive biassing for the second valve, whereby the negative going leading edges of the pulses appearing at point $P_4$ are inoperative to cause a change of conductivity for this tube, but the positive going leading edges of the said negative pulses will cause the arrangement to trigger and the first valve is unblocked.

The time constant of the monostable pulse generator $MMV_1$ is so chosen that it delivers pulses of $t=25$ microseconds duration. These pulses, at point $P_5$, therefore follow immediately the pulses $Pa_{22}$.

The negative pulses at point $P_5$ are fed to the input of a phase splitter $PHS_2$ which is designed in exactly the same way as the phase splitter $PHS_1$. Therefore, assuming that point $P_6$ is coupled to the plate of the valve forming the essential part of the phase splitter $PHS_2$ positive pulses such as those shown in Fig. 3 will be obtained. These are the $Pa_{23}$ pulses, a corresponding $Pa_{23}$ terminal being shown connected to terminal $P_6$ through break contact $b_{23}$ of relay $Br_2$.

The pulses $Pa_{23}$ are further applied from terminal $P_6$ to a pulse shaping circuit which produces at its output terminal $P_7$ negative trigger pulses which are applied to terminal $Pa_{24}$ through break contact $b_{24}$ of relay $Br_2$. The corresponding $Pa_{24}$ wave form is shown in Fig. 3. The pulse shaping circuit PSH can comprise a monostable flip-flop circuit formed by two tubes coupled by their cathodes, the output tube including an inductance in its plate circuit designed to differentiate the front and rear flanks of the $Pa_{23}$ pulses. This valve arrangement is arranged to deliver only the trigger pulses corresponding to the leading edges of the $Pa_{23}$ pulses and further includes an amplifying tube to the control grid to which these positive trigger pulses are applied, whereby the negative trigger pulses shown as $Pa_{24}$ in Fig. 3 are obtained at terminal $P_7$ coupled to the anode of said amplifying tube. To fix ideas, these pulses may be assumed to have a duration of some 4 microseconds.

These pulses are in a suitable form to be used as trigger pulses for pulse distributors in the manner disclosed in the Belgian Patent No. 504,604. The reason for producing these trigger pulses from the positive rectangular $Pa_{22}$ pulses and to produce also the rectangular positive $Pa_{23}$ pulses following immediately the $Pa_{22}$ pulses, is that these last two types of pulses can be conveniently used as stop and start pulses respectively for the pulses of duration T equal to 200 microseconds which the distributors (not shown) will deliver in response to the trigger pulses $Pa_{24}$. The pulses delivered by the distributors can perform various functions in telecommunication equipment and in the course of these, some may become distorted whereby it becomes necessary to regenerate them and obtain fresh clean pulses. Such regeneration can conveniently occur with the help of a short pulse such as $Pa_{23}$ defining the start of a distributor pulse and by means of a short pulse such as $Pa_{22}$ defining the end of a distributor pulse. The method of producing the trigger pulses $Pa_{24}$ in conjunction with the short start and stop pulses $Pa_{23}$ and $Pa_{22}$ is distinctive with respect to the method disclosed in the Belgian Patent No. 504,604 mentioned above, since in the latter trigger pulses with a period $t$ are first produced and these are applied to a distributor with a number of outlets which produces series of pulses all recurring with a period T but shifted with respect to one another so that one output from this distributor could be used to drive a pulse shaping circuit to obtain a series of pulses such as $Pa_{24}$ with a period T whereas two other outlets could be used to deliver the pulses $Pa_{23}$ and $Pa_{22}$. Such a distributor, however, necessitates a fairly large number of valves since at least two valves must be used for each outlet and since the number of outlets and tubes depends upon the ratio $$\frac{T}{t}$$

The $Pa_{24}$ pulses are also applied from terminal $P_7$ to the input of a flip-flop or monostable multivibrator circuit $MMV_2$ which may correspond identically to the monostable multivibrator $MMV_1$ already described. At its output terminal $P_8$, this flip-flop will deliver pulses shown as $Pb_{23}$ in Fig. 3. These pulses are therefore identical to the $Pa_{23}$ pulses but whereas the duration of the latter is fixed by the time constant of the flip-flop $MMV_1$, the duration of the former is fixed by the time constant of the flip-flop $MMV_2$. The $Pb_{23}$ pulses at terminal $P_8$ are fed to an integrating circuit INT which can consist of a series resistor followed by a shunt condenser.

The second output from the phase splitter $PHS_2$ delivered at terminal $P_9$ consists in pulses similar to the $Pa_{23}$ pulses but with an inverted polarity, since terminal $P_9$ corresponds with the cathode of a tube whereas terminal $P_6$ corresponds with the plate of the same tube. The negative pulses at terminal $P_9$ are applied to a differentiating circuit DIF which can consist of a series condenser followed by a shunt resistor. The outputs of the integrating circuit INT and the differentiating circuit DIF are commoned to terminal $P_{10}$ which is the input terminal of an amplifying circuit $AMP_2$ which may be deemed similar to the amplifying stage $AMP_1$. This mixing of the two outputs will occur via capacitive couplings including a condenser in series with a resistor, i. e. a series combination of a resistor and a condenser can be assumed to follow the shunt condenser in INT and a similar series combination can be assumed to follow the shunt resistor in DIF and be respectively included in said circuits INT and DIF. Both the series resistors should be designed so that in relation to the input resistance of the amplifier $AMP_2$ they form suitable potentiometers for properly adding the waveform from INT to that from DIF. The waveform from INT is shown as $Pb_{24}$ and that from DIF as $Pb_{25}$. In the latter waveform, the negative spikes corresponding to the leading edges of the $Pb_{23}$ pulses have not been shown as they perform no useful function. The amplifier $AMP_2$ is normally biassed well below cut-off so that the $Pb_{24}$ and $Pb_{25}$ positive pulses cannot on their own unblock the valve forming the amplifier $AMP_2$. It is only when a $Pb_{25}$ positive pulse corresponds with the top part of a $Pb_{24}$ pulse that the sum of these pulses will sufficiently raise the potential at terminal $P_{10}$ so that the valve forming the amplifier $AMP_2$ will become conductive resulting in a negative pulse corresponding to the inverted top part of the $Pb_{25}$ pulse appearing at its anode which is coupled to terminal $P_{11}$. The negative trigger pulses which appear at terminal $P_{11}$ upon coincidence of a properly located $Pb_{24}$ pulse with a properly located $Pb_{25}$ pulse are fed to the input of a flip-flop or monostable multivibrator $MMV_3$ which can be assumed to be designed in exactly the same way as the flip-flops $MMV_1$ and $MMV_2$, but this time with a longer time constant, greater than $T=200$ microseconds, e. g. 350 microseconds. Therefore, a negative trigger pulse at the terminal $P_{11}$ will result in the appearance of a positive pulse at $P_{12}$ the output terminal from $MMV_3$. Such pulses are shown as $Pb_{26}$ in Fig. 3.

Terminal $P_{13}$ represents a second input for the flip-flop $MMV_3$ which is used to restore the latter to its stable condition without waiting for the natural restoration which depends on the time constant of the circuit. To its terminal $P_{13}$ is connected the conductor $L_{12}$ which originates in the other half of the pulse generator and to which conductor $L_{22}$ corresponds. Conductor $L_{12}$ is therefore connected to a terminal $P'_4$ (not shown) in the other half of the pulse generator, which terminal corresponds to terminal $P_4$ in that half of the generator shown in Fig. 2. This terminal is the second output from the phase splitter $PHS_1$ and is coupled to the cathode of the tube forming this stage. Therefore, since terminal $P_3$ is connected to the anode of this same tube, the pulses at terminal $P_4$ correspond with the $Pa_{22}$ pulses except that their polarity is reversed and that they are therefore negative pulses. As terminal $P_{11}$ is coupled to the control grid of the valve part of $MMV_3$ which is normally conductive, terminal $P_{13}$ will be coupled to the other valve forming the circuit $MMV_3$, i. e. that which is normally non-conductive but which has become conductive upon a negative trigger pulse having appeared at terminal $P_{11}$ as explained. Terminal $P_{13}$ is coupled to the grid of said other valve through a uni-directional capacitive coupling including a condenser in series with a rectifier, the latter being so poled that only the leading edges of the negative pulses at terminal $P'_4$ are effective. Therefore, differentiated negative trigger pulses corresponding in time with the leading edge of the $Pa_{22}$ pulses are effective to positively return the flip-flop $MMV_3$ to its stable condition when in the unstable condition. This results, during normal operation, in the positive pulses at terminal $P_{12}$ assuming the shape shown as $Pb_{26}$ in Fig. 3. The pulses at terminal $P_{12}$ are further delivered to a cathode follower stage CFL which includes a tube having its cathode coupled to the output terminal $P_{14}$. Therefore, pulses similar to the $Pb_{26}$ pulses will also appear at terminal $P_{14}$.

The positive pulses at terminal $P_{12}$ which correspond to the control pulses $Pb_{21}$ shown in Fig. 1, are applied to a conductor $L_{23}$ leading to the other half of the pulse generator. This conductor $L_{23}$ has a counter part $L_{13}$ connected to a terminal $P'_{12}$ (not shown) in the other half of the circuit and which acts as input conductor for the gate $G_2$ represented as a small circle with two conductors having arrows pointing towards its centre. One of these is $L_{13}$ and the other is the conductor which carries the pulses delivered at terminal $P_{14}$. A third conductor without an arrow is also shown pointing towards the centre of the small circle representing the gate $G_2$ and it constitutes the outlet conductor from this gate leading to the bistable electrical device $A_2$. The gate $G_2$ is so arranged that a pulse on conductor $L_{13}$ will be allowed to be delivered to the device $A_2$ in its original or modified form if there is no coincident pulse on the conductor coming from terminal $P_{14}$. A pulse on this last conductor has thereby an inhibitive character which is indicated by a small line across the conductor next to the arrow.

The bistable device $A_2$ is normally in one stable condition such that the potential on its output conductor $L_3$ which is multipled to the circuits OSC, $MMV_1$, PSH and $MMV_3$, does not exert any blocking action on these circuits which would prevent them to perform their normal tasks. As long as positive pulses are delivered at terminal $P_{14}$ corresponding in time with pulses delivered at terminal $P'_{12}$ (not shown) and applied to conductor $L_{13}$, the gate $G_2$ does not issue an output pulse to the device $A_2$. Upon a pulse at terminal $P_{14}$ being missed, the gate $G_2$ will no longer be blocked and a pulse on conductor $L_{13}$ will be allowed to trigger the device $A_2$ into its second stable condition in which the potential on conductor $L_3$ is sufficiently changed to block the circuits OSC, $MMV_1$, PSH and $MMV_3$. This action is necessary, as the absence of a pulse at terminal $P_{14}$ indicates a faulty condition in one of the circuits shown in Fig. 2 whereby this half of the pulse generator should instantaneously be disabled, the remaining half now supplying the full power to the common load. The instantaneous blocking action is also followed by a disconnection of the terminals $Pa_{22}$, $Pa_{23}$ and $Pa_{24}$ respectively from terminals $P_3$, $P_6$ and $P_7$ as the bistable device $A_2$ which is being triggered to its second stable and off normal condition also causes the operation of relay $Br_2$ by applying ground (not shown) to the end of its winding which is not connected to negative battery. In operating, relay $Br_2$ interrupts the circuits above mentioned at contacts $b_{22}$, $b_{23}$, $b_{24}$ and locks through contact $b_{21}$ and key contact $k$, the later being used to restore relay $Br_2$ to its de-energized condition after the trouble has been cleared. It will be recognized that the arrangement $G_2$, $A_2$, $Br_2$ represents one half of the pulse comparator, the remaining half not being shown as it is identical to that represented in Fig. 2. In practice, the gate function may be accomplished by the grid cathode circuit of a gas tube and the bistable device $A_2$ may be constituted by the main gap of said gas tube associated with a relay, as disclosed in the above mentioned Belgian Patent No. 504,605.

With the help of Fig. 3, the various faults which can occur and cause an appropriate reaction of the pulse comparator, can be readily followed. The essential difference with the basic diagram shown in Fig. 1 is that there are now two adjacent pulses such as $Pa_{12}$ and $Pa_{13}$ which are generated instead of a single pulse $Pa_{11}$ as in Fig. 1. The control pulse $Pb_{16}$ of Fig. 3 corresponds to the control pulse $Pb_{11}$ of Fig. 1 while the auxiliary control pulse $Pb_{13}$ of Fig. 3 corresponds with the auxiliary control pulse $Pb_{12}$ of Fig. 1.

If one of the devices PSH, $MMV_2$ or INT develops a fault, the integrated gating pulse $Pb_{24}$ will not be generated and this will prevent the generation of the control pulse $Pb_{26}$ at terminals $P_{12}$ and $P_{14}$ and as a result the bistable device $A_2$ will be triggered to its off normal condition indicating the fault.

If there is a fault in $MMV_1$ or $PHS_2$ leading to the disappearance of the $Pa_{23}$ pulse or to a change in length for said pulse, it is clear that the pulse comparator will again react in the same way.

If pulse $Pa_{22}$ varies in length, this leads to pulse $Pb_{25}$ being incorrectly located with respect to pulse $Pb_{24}$ and again the control pulse $Pb_{26}$ cannot be generated.

If the devices $MMV_3$ or CFL fail to deliver a control pulse, this again leads to the operation of $A_2$.

Concerning the auxiliary control pulse generator $MMV_2$, it will be noticed that due to the integration of the $Pb_{23}$ pulse being used to provide the gating pulse $Pb_{24}$, only a reduction of the length of the $Pb_{23}$ pulse will prevent pulse $Pb_{25}$ from causing a production of the control pulse $Pb_{16}$. If there is a lengthening of the $Pb_{23}$ pulse, the $Pb_{25}$ pulse will still be allowed to trigger the flip-flop $MMV_3$ resulting in the production of the control pulse $Pb_{26}$ as if no fault had been detected. This is of no consequence however, as the $Pb_{23}$ pulses which have become too long, are not used in any external circuitry. It only means that if this fault in the auxiliary control pulse persists until a fault is also originated in the generation of a $Pa_{23}$ pulse, which might cause the latter pulse to increase its length unduly, this will not be detected until the length of the $Pa_{23}$ pulse reaches twice its normal length which corresponds to the delay in the response of the pulse comparator mentioned above in relation to Fig. 1.

The arrangement described and shown by Fig. 2 which constitutes a pilot generator for generating trigger pulses at a well defined frequency and with full reliability of opeartion can be used in the system such as described in the Belgian Patent No. 504,604 mentioned above. Preferably, however, it should be used as indicated in block schematic form in Fig. 4.

This Fig. 4 represents two pilot generators $PIL_1$ and $PIL_2$ each of which corresponds to an arrangement shown in Fig. 2 and they are therefore mutually synchronized and provided with a control circuit as explained above. Normally, both the outlets of the pilot generators $PIL_1$ and $PIL_2$ will be commoned to all the inlets of the distributors which are driven by the trigger pulses such as $Pa_{14}$ and $Pa_{24}$. A pair of distributors $DIS_1$ and $DIS_2$ is shown in Fig. 4 with the two inlets connected to the two outlets from $PIL_1$ and $PIL_2$. Both the devices such as $PIL_1$ and $DIS_1$ are normally designed so that they supply the right shape of wave form but power stages are necessary to obtain the right amount of power required by the loads. A pair of outlets from corresponding stages in the pulse distributors $DIS_1$ and $DIS_2$ are shown to be commoned to the inlets of three power amplifiers $POW_1$, $POW_2$ and $POW_3$ which will supply in parallel the necessary power for a common load. The normal connection of all the outlets from one stage to all the inlets of the next stage for pulses of the same nature is advantageous in that instead of having two independent chains with several links, whereby one chain becomes useless if one link is broken resulting in complete failure should a link in the remaining chain be broken while the first broken link has not been repaired, one has in fact a common chain and each link thereof is at least duplicated whereby the failure of one link can still be followed before it can be corrected by the failure of other links not corresponding with one another.

If for instance the pilot generator $PIL_2$, the distributor $DIS_1$, and the power amplifier $POW_3$ are defective, the load can still be supplied from the pilot generator $PIL_1$, via the distributor $DIS_2$ and the two power amplifiers in parallel $POW_1$ and $POW_2$ which now deliver each one half of the total power instead of one third of the total power when all three power amplifiers are in service.

While the principles of the invention have been described above in connection with specific apparatus, it is to be clearly understood that this description is made only by way of example and not as a limitation on the scope of the invention.

We claim:

1. A control circuit for a pulse generating system having identical first and second pulse oscillator continuously and normally producing cophasal output pulses of equal duration and period, means responsive to said output pulses from said first and second oscillators for producing first and second control pulses respectively, and means, controlled by the control pulses and inoperative in the presence of both first and second control pulses, for blocking the oscillator whose corresponding control pulse is absent during the presence of the control pulse of the other oscillator, characterized by means within said control pulse producing means responsive to a change of duration of said output pulses of said first and second oscillator in either direction as well as their change in phase or absence thereof for aborting the pulses of the corresponding oscillator, said control pulse producing means comprising a first and second two-output condition device each having a natural period different from the normal repetition period of said oscillators, and means for applying said output pulses to said two-condition devices, the outputs of said two condition devices being coupled to the inputs of said blocking means.

2. A control circuit according to claim 1 wherein said two-condition devices are monostable trigger devices whose natural period is greater than the normal repetition period of said oscillators.

3. A control circuit according to claim 1 wherein said devices comprise trigger circuits and said means for applying thereto the output pulses of said oscillator circuits includes means for applying the output pulses of the first oscillator to the first trigger circuit to trip it from a first condition to a second and means for applying the output pulses from the second oscillator to said first trigger circuit to trip it from its second to its first condition, and means for applying the output pulses of the second oscillator to the second trigger circuit to trip it from its first to its second condition and means for applying the output pulses from said first oscillator to said second trigger circuit to restore it to its first condition.

4. A control circuit according to claim 3 wherein said trigger circuits are bi-stable trigger circuits.

5. A control circuit according to claim 3 further including for each oscillator a third and a fourth monostable trigger circuit whose natural periods are such that their duration is equal to the normal duration of the output pulses of said oscillators, means for applying the output pulses from each of said first and second oscillators to the corresponding third and fourth trigger circuits and means for applying the output pulses from said third and fourth trigger circuits to said first or second trigger circuit to initially trip it from its first to its second condition.

6. A control circuit according to claim 5 wherein said means for applying the output pulses from said third trigger circuit to said first or second trigger circuit comprises an integrating circuit, and wherein said means for applying the output pulses from said fourth trigger circuit to said first or second trigger circuits comprises a differentiating circuit, outputs of said integrating and differentiating circuit being mixed before their application to said first or second trigger circuit.

References Cited in the file of this patent
UNITED STATES PATENTS

| | | |
|---|---|---|
| 2,319,320 | Hepp | May 18, 1943 |
| 2,330,582 | Hepp | Sept. 28, 1943 |
| 2,448,336 | Weiner | Aug. 31, 1948 |
| 2,538,027 | Mozley et al. | Jan. 16, 1951 |